(12) United States Patent
Tonnele et al.

(10) Patent No.: US 12,479,562 B2
(45) Date of Patent: Nov. 25, 2025

(54) FLEXIBLE CORNER FITTING INTENDED TO CONTRIBUTE TO A CONNECTION BETWEEN AT LEAST THREE WALLS OF AT LEAST ONE AIRCRAFT BOX STRUCTURE

(71) Applicant: Airbus Operations SAS, Toulouse (FR)

(72) Inventors: Arnaud Tonnele, Toulouse (FR); Javier Maqueda Lahoz, Toulouse (FR); Frédéric Goupil, Toulouse (FR); Vincent Fauchille, Toulouse (FR); Carole Beau, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 454 days.

(21) Appl. No.: 18/077,720

(22) Filed: Dec. 8, 2022

(65) Prior Publication Data

US 2023/0192266 A1   Jun. 22, 2023

(30) Foreign Application Priority Data

Dec. 16, 2021   (FR) ...................................... 2113634

(51) Int. Cl.
*B64F 5/00*   (2017.01)
*B23B 47/28*   (2006.01)
(Continued)

(52) U.S. Cl.
CPC ............ *B64C 1/061* (2013.01); *B23B 47/287* (2013.01); *B64F 5/10* (2017.01); *F16B 5/0004* (2013.01)

(58) Field of Classification Search
CPC ... B64C 1/06; B64C 1/061; B64F 5/00; B64F 5/10; B23B 47/00; B23B 47/287; F16B 5/00; F16B 5/0004
See application file for complete search history.

(56) References Cited

U.S. PATENT DOCUMENTS 3,877,138 A * 4/1975 Suchowski ........ A47B 47/0008
                                              29/513
3,919,603 A * 11/1975 Salvati ..................... H02B 1/01
                                              220/668

(Continued)

FOREIGN PATENT DOCUMENTS

| CA | 2763531 A1 | 12/2010 |
| FR | 2872781 A1 | 1/2006 |
| FR | 3091259 A1 | 7/2020 |

OTHER PUBLICATIONS

French Search Report for French Patent Application No. 2113634 dated Jul. 21, 2022; priority document.

*Primary Examiner* — Chi Q Nguyen
(74) *Attorney, Agent, or Firm* — Greer, Burns & Crain, Ltd.

(57) ABSTRACT

A flexible corner fitting configured to contribute to a connection between at least three walls of at least one aircraft box structure, and to make them leaktight with respect to liquids. The corner fitting has at least three fixing plates and at least three edge corners made of flexible material. Each of the at least three fixing plates is connected to each of the other at least three fixing plates by one of the edge corners made of flexible material. The edge corners made of flexible material ensure adjustment of the corner fitting without machining or the addition of shims.

9 Claims, 6 Drawing Sheets

(51) Int. Cl.
  *B64C 1/06*   (2006.01)
  *B64F 5/10*   (2017.01)
  *F16B 5/00*   (2006.01)

(56)  References Cited

U.S. PATENT DOCUMENTS

| | | | |
|---|---|---|---|
| 6,205,738 B1* | 3/2001 | Chen | E04C 3/28 |
| | | | 52/655.1 |
| 6,962,262 B2* | 11/2005 | Toma | F16B 12/50 |
| | | | 211/189 |
| 11,857,074 B2* | 1/2024 | Giraud | A47B 96/06 |
| 11,933,336 B2* | 3/2024 | Suzuki | F16B 12/50 |
| 12,251,018 B2* | 3/2025 | Giraud | A47B 47/0008 |
| 2004/0155002 A1* | 8/2004 | Toma | F16B 12/50 |
| | | | 211/183 |
| 2006/0226288 A1 | 10/2006 | Vetillard et al. | |
| 2007/0052333 A1* | 3/2007 | Freire | F24F 13/20 |
| | | | 312/265.4 |
| 2012/0043422 A1* | 2/2012 | Campana | B64C 3/26 |
| | | | 244/123.1 |
| 2012/0061513 A1 | 3/2012 | Gallant et al. | |
| 2020/0207455 A1 | 7/2020 | Gauthie | |

* cited by examiner

FLEXIBLE CORNER FITTING INTENDED TO CONTRIBUTE TO A CONNECTION BETWEEN AT LEAST THREE WALLS OF AT LEAST ONE AIRCRAFT BOX STRUCTURE

CROSS-REFERENCES TO RELATED APPLICATIONS

This application claims the benefit of the French patent application No. 2113634 filed on Dec. 16, 2021, the entire disclosures of which are incorporated herein by way of reference.

FIELD OF THE INVENTION

The present invention relates to a flexible corner fitting which is leaktight with respect to any fluid, such as, for example, a fuel, and to a method for manufacturing the corner fitting.

BACKGROUND OF THE INVENTION

A structural reservoir of an aircraft, such as a central wing box or an outer wing box, corresponds to a complex structural device comprising an assembly of metal or composite structural parts with various thicknesses that are joined together by fixing parts.

A corner fitting is used to assemble the various structural parts at the corners where three structural parts meet. This corner fitting of the prior art corresponds to a rigid structural fitting comprising three contact surfaces, which ensures both leaktightness and load strength of the structural device.

Correct installation of such a corner fitting is complex and requires a lot of time. This is because two aircraft airframes do not always have the same geometry. If the rigid corner fitting is assembled at its three contact surfaces without adjusting these contact surfaces, it would be impossible to fill the spaces between the parts of the structural device and the contact surfaces of the corner fitting.

In a first prior art approach, for each aircraft to be assembled, the contact surfaces of the corner fitting are machined in order to adapt its shape to the shape of the structural device to be assembled. This implies that measurements must be taken after the main structures of the aircraft have been assembled. Once the measurements have been taken, the assembly must stop while the corner fitting is machined on the basis of the measurements. In addition, the corner fitting, once it has been machined, must be repainted and given another surface treatment, since the machining will have altered the surface of the corner fitting. All these operations are expensive and cause a lengthening of the delay to the process for assembling the aircraft airframe.

According to a second prior art approach, the corner fitting is adjusted using shims. This makes it possible to avoid repainting the corner fitting and giving the corner fitting another surface treatment, since it is not necessary to machine it. However, that involves the manufacture of suitable shims, this also causing significant delays to the process for assembling the airframe. Furthermore, the use of shims complicates the application of sealing material to the corner fitting.

In all cases, the need to adjust the corner fitting often causes significant assembly delays.

SUMMARY OF THE INVENTION

An aim of the present invention is to rectify this drawback. To that end, it relates to a corner fitting intended to contribute to a connection between at least three walls of at least one aircraft box structure.

According to the invention, the corner fitting has at least three fixing plates and at least one edge corner made of flexible material, each of the at least three fixing plates having an outer surface intended to be fixed respectively to a wall of the box structure(s), each of the at least three fixing plates being connected to each of the other at least three fixing plates by an edge corner made of flexible material.

Thus, by virtue of the edge corners, made of flexible material, of the corner fitting, adjustment is provided by the flexibility of the edge corners. It is no longer necessary to machine the corner fitting or to add shims. Assembly delays are reduced considerably. In addition, the edge corners contribute to the leaktightness with respect to fluid that is afforded by the corner fitting.

According to one embodiment, at least one of the at least three fixing plates comprises at least one drilling site intended to be drilled so as to form a fixing opening configured to allow a fixing element to pass through, the corner fitting having at least one O-ring made of flexible material overmolded around at least one drilling site, the outer surface of the at least three plates having a circular groove machined around the drilling site(s), the O-ring(s) being overmolded on the bottom of the circular groove.

According to another embodiment, at least one of the at least three fixing plates comprises at least one fixing opening configured to allow a fixing element to pass through, the corner fitting having at least one O-ring made of flexible material overmolded around at least one fixing opening, the outer surface of the at least three plates having a circular groove machined around the opening(s), the O-ring(s) being overmolded on the bottom of the circular groove.

Furthermore, the corner fitting has at least one peripheral sealing strip made of flexible material, the peripheral strip(s) dividing each outer surface into two parts while still forming a closed loop overall, the corner fitting having at least one peripheral groove passing over the outer surface of each of the at least three fixing plates, the peripheral groove(s) each forming a closed loop passing all around the corner fitting, in the process passing over each of the outer surfaces, a single peripheral strip being overmolded on the bottom of each of the peripheral grooves.

According to one particular feature, at least one fixing plate comprises at least two portions connected to one another by a separation joint made of flexible material, the separation joint made of flexible material being connected to at least one edge corner of the corner fitting.

In addition, the flexible material corresponds to an incompressible hyperelastic material.

Advantageously, the flexible material corresponds to an elastomer.

The invention also relates to an aircraft, in particular a transport plane, comprising at least one box structure having at least one corner to which is fixed a corner fitting as described above.

The invention also relates to a method for manufacturing a corner fitting.

According to the invention, the method comprises the following steps:
  a step of installing at least three fixing plates having an outer surface intended to be fixed respectively to a wall of the box structure(s), each of the at least three fixing plates being installed such that each outer surface is configured to be able to be fixed respectively to a wall of the box structure(s), a step of overmolding at least one edge corner on at least three fixing plates such that each of the at least three fixing plates is connected to each of the other at least three fixing plates by an edge corner made of flexible material.

BRIEF DESCRIPTION OF THE DRAWINGS

The appended figures will make it easy to understand how the invention may be realized. In these figures, identical references denote similar elements.

DETAILED DESCRIPTION OF THE PREFERRED EMBODIMENTS

Figure 1:
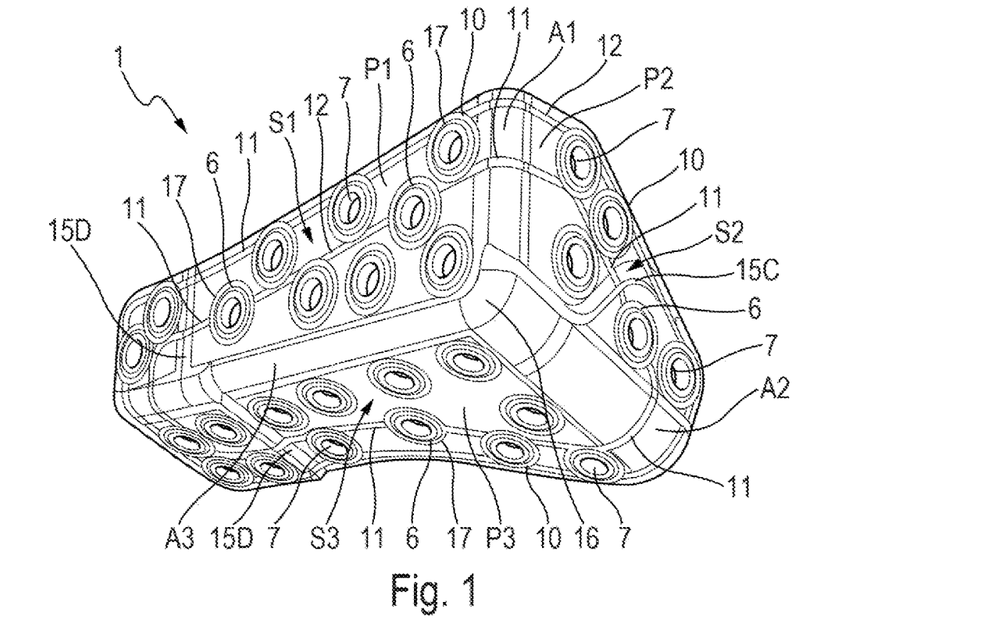
FIG. 1 shows a perspective view of one embodiment of the corner fitting. The view is directed at the outer surfaces of the fixing plates.

One embodiment of the corner fitting 1 is shown in FIG. 1.

The corner fitting 1 has the aim of providing, among other things, leaktightness with respect to fuel for a reservoir such as a central wing box 5 or an outer wing box 5 of an aircraft, in particular a transport plane, while still being able to take up mounting tolerances and the small relative movements that can arise during operation. The box structure(s) 5 can correspond to one or more closed or open box structures. In the rest of the description, "box structure 5" will be used to refer to the central wing box or the outer wing box.

Figure 7:
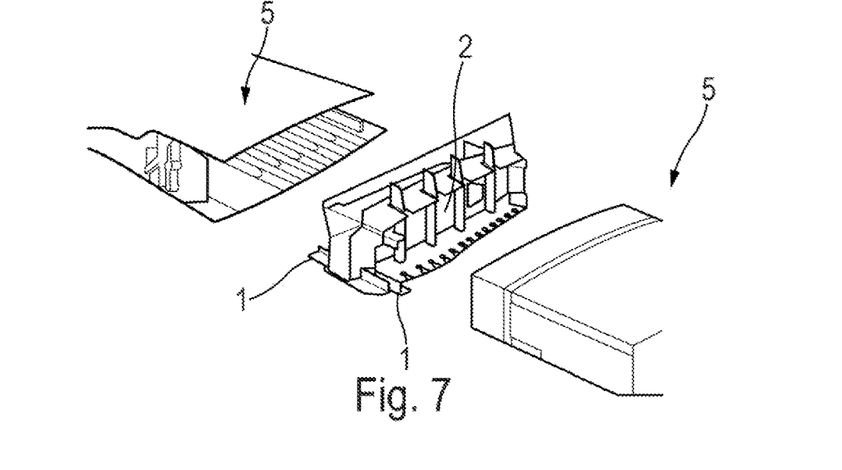
FIG. 7 shows an exploded view, in perspective, of a wall and its box structure intended to be fixed to one another by corner fittings.
Figure 8:
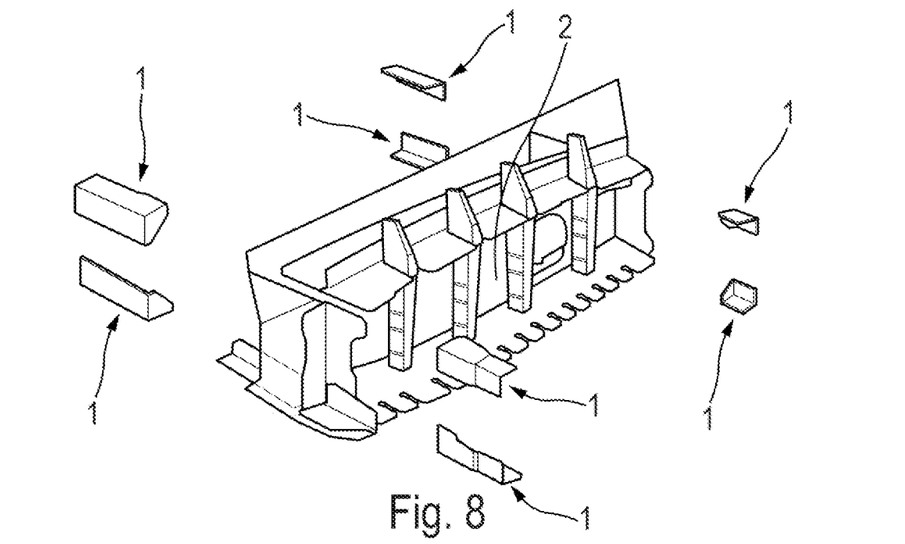
FIG. 8 shows an exploded view, in perspective, of a wall of a box structure and corner fittings intended to be fixed to the wall.
Figure 11:
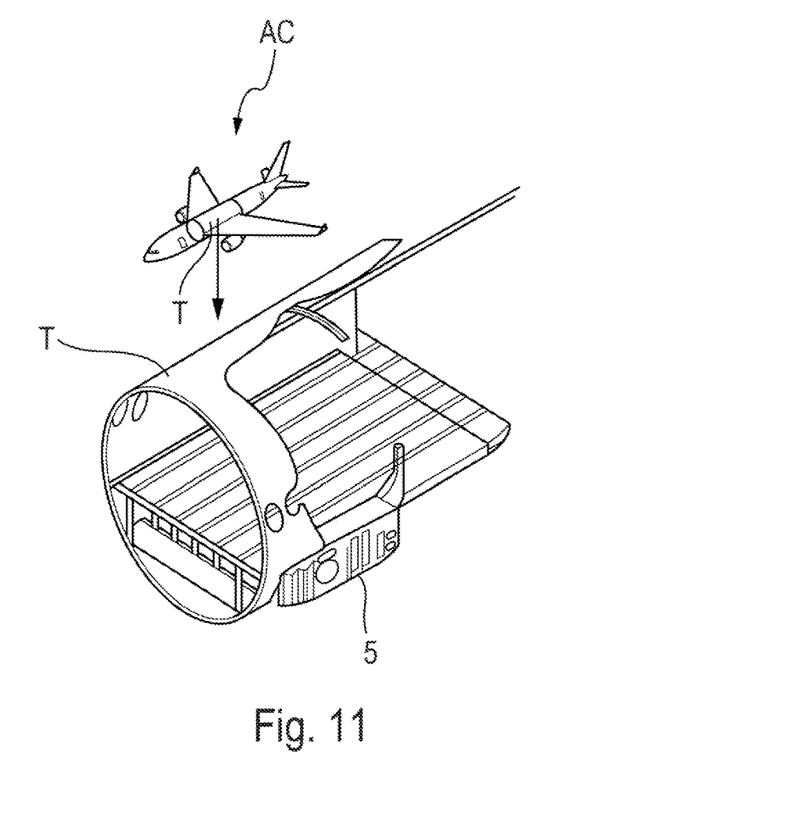
FIG. 11 shows an aircraft and a section of fuselage of the aircraft having a box structure, in particular a central wing box.

FIG. 11 shows a section of fuselage T of an aircraft AC comprising at least one box structure 5 to which at least one corner fitting 1 is fixed, as shown in FIG. 7 and FIG. 8. The corner fitting 1 may be used to join the walls 2, 3, 4 of a box structure 5 or multiple box structures 5.

Figure 2:
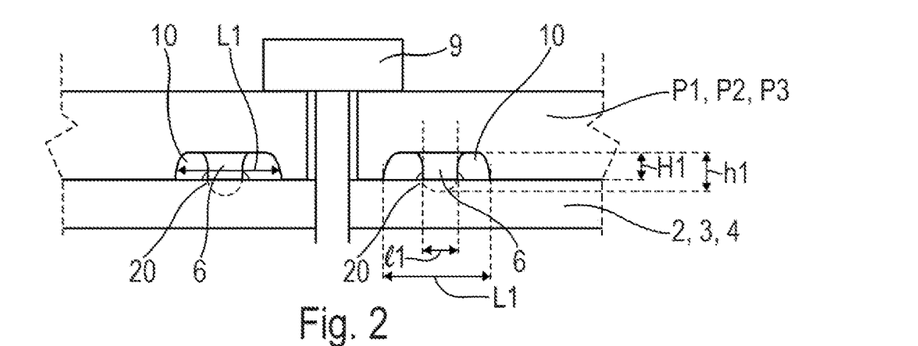
FIG. 2 shows a cross section of a corner fitting through a fixing opening and of an O-ring surrounding the fixing opening.
Figure 9:
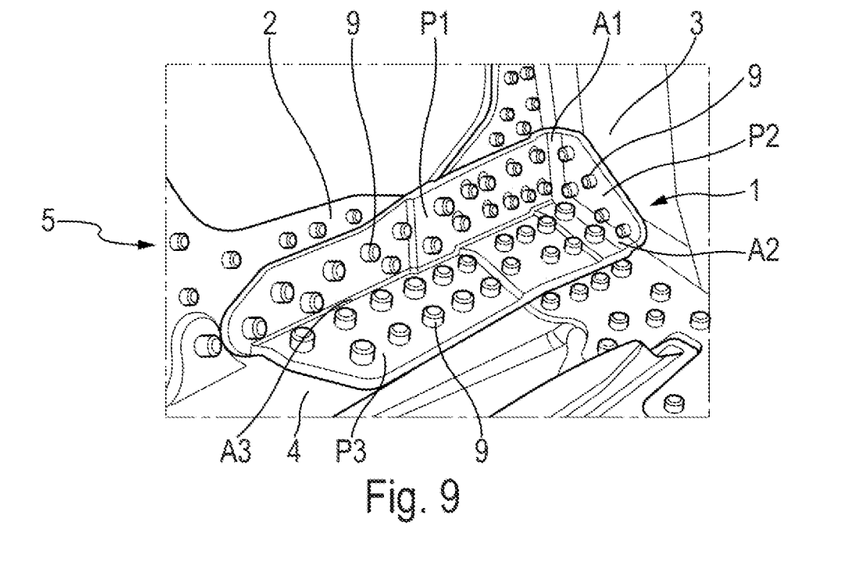
FIG. 9 shows a perspective view of a corner fitting fixed to walls of at least one box structure.

The corner fitting 1 has at least three (rigid) fixing plates P1, P2, P3 and at least three edge corners A1, A2, A3 made of flexible material. Each of the at least three fixing plates P1, P2, P3 has an outer surface S1, S2, S3 configured to be fixed respectively to a wall 2, 3, 4 of the box structure(s) 5, for example using at least one fixing element 9 (FIG. 2 and FIG. 9).

Non-limitingly, a fixing element 9 may correspond to a rivet or a screw.

Each of the at least three fixing plates P1, P2, P3 is connected to each of the other at least three fixing plates P1, P2, P3 by an edge corner A1, A2, A3 made of flexible material. The flexible material may correspond to any incompressible hyperelastic material. For example, the flexible material may correspond to an elastomer. The fixing plates P1, P2, P3 are manufactured from rigid material and therefore from more rigid material than the flexible material of the edge corners A1, A2, A3, such that the flexibility of the edge corners makes it possible for one plate to move in relation to another and thus to adjust the positioning of the plates in relation to the aircraft box structure in question, so as to make it possible to take up the mounting tolerances. According to one possible embodiment, the rigid material chosen for the plates has a modulus of elasticity in megapascals (MPa) at least one thousand times greater than the modulus of elasticity of the material chosen for the edge corners. According to one material example, the fixing plates P1, P2, P3 are manufactured from metal, such as aluminum. The fixing plates P1, P2, P3 may also be manufactured from a composite material more rigid than the flexible material of the edge corners A1, A2, A3.

The fixing plates P1, P2, P3 are thus connected to one another only by an edge corner A1, A2, A3 made of flexible material. No structural connection, except for the edge corners A1, A2, A3, connects the fixing plates P1, P2, P3 to one another.

The fixing plates P1, P2, P3 may be substantially perpendicular with respect to one another. According to one variant, the fixing plates P1, P2, P3 are not perpendicular with respect to one another. The position of the fixing plates P1, P2, P3 with respect to one another depends on the position of the walls 2, 3, 4 of the box structure(s) 5 with respect to one another.

The edge corners A1, A2, A3 are formed by continuous bands. Furthermore, the edge corners A1, A2, A3 all meet at the apex 16 of the shape of the corner fitting 1. This contributes to the leaktightness afforded by the corner fitting 1 while still offering the possibility of small relative movements between the fixing plates P1, P2, P3.

Thus, if the corner fitting 1 comprises three fixing plates P1, P2, P3, it corresponds to a corner shape having three faces, for example, substantially perpendicular with respect to one another. The edge corners A1, A2, A3 of this corner shape are made of flexible material. In FIG. 1, FIG. 4, FIG. 5 and FIG. 6, the fixing plate P1 is connected to the fixing plate P2 by the edge corner A1. The fixing plate P2 is connected to the fixing plate P3 by the edge corner A2. The fixing plate P3 is connected to the fixing plate P1 by the edge corner A3.

According to a first embodiment, the corner fitting 1 may have at least one O-ring 6 made of flexible material (FIG. 1). The O-ring(s) 6 are overmolded around a drilling site 8 (FIG. 5) configured to be drilled so as to form a fixing opening 7 configured to allow a fixing element 9 to pass through (FIG. 2). The fixing opening(s) 7 may thus be formed when the corner fitting 1 is being fixed to the walls 2, 3, 4 of the box structure(s) 5. The drilling site(s) 8 may also comprise at least one guide hole. The O-ring(s) 6 are overmolded around the guide hole(s). The guide hole(s) may thus be bored so as to form the fixing opening(s) 7 before or during the fixation of the corner fitting 1 to the walls 2, 3, 4 of the box structure(s) 5. This embodiment contributes to taking up the mounting tolerances. The guide hole(s) are bored to the final diameter of the fixing openings 7 once the corner fitting 1 has been temporarily installed and before it is fixed.

According to a second embodiment, at least one of the at least three fixing plates P1, P2, P3 comprises at least one fixing opening 7 configured to allow a fixing element 9 to pass through. This embodiment makes it possible to avoid a deburring step after the fixing opening(s) have been formed.

In this second embodiment, the corner fitting 1 may have at least one O-ring 6 made of flexible material (elastomer) overmolded around the fixing opening(s) 7.

In the first embodiment and the second embodiment, the outer surface S1, S2, S3 of the fixing plate or of the at least three fixing plates P1, P2, P3 has a circular groove 10 machined around the fixing opening 7 or each of the fixing openings 7 or around the drilling site 8 or each of the drilling sites 8. The O-ring(s) 6 are overmolded on the bottom of each circular groove 10 (FIG. 2).

With preference, the circular groove 10 has a height H1 less than the height h1 of the O-ring(s) 6 in order that the O-ring(s) 6 can be compressed between the wall(s) 2, 3, 4 of the box structure(s) 5 and the bottom of the circular groove 10. The circular groove 10 moreover has a width L1 greater than the width ℓ1 of the O-ring(s) 6. This difference in width makes it possible for the O-ring 6 or the O-rings 6 to be able to deform and to be able to spread out in the circular groove 10 when it is or they are compressed between the wall(s) 2, 3, 4 of the box structure(s) 5 and the bottom of the circular groove 10. This deformation and spreading-out option is particularly advantageous for incompressible flexible materials, such as an elastomer. It makes it possible for the seal to provide leaktightness while still enabling the surfaces (outer surfaces S1, S2, S3 and contact surfaces of the walls 2, 3, 4 configured to be in contact with the outer surfaces S1, S2, S3) to be in contact: the seal is flush with the surfaces. FIG. 2 shows a cross section of an O-ring 6 overmolded in a circular groove 10. The dashed line shows the O-ring 6 in the non-deformed state. FIG. 2 also shows the O-ring 6 as a continuous line when the O-ring 6 is deformed when the corner fitting 1 is fixed to the walls 2, 3, 4 of the box structure(s) 5. FIG. 2 shows the deformation 20 of the O-ring 6 as a continuous line.

The first embodiment and the second embodiment may be combined. This is because one corner fitting may comprise one or more fixing plates P1, P2 or P3 having one or more drilling sites 8 and one or more fixing plates P1, P2 or P3 having one or more fixing openings 7. Furthermore, a fixing plate P1, P2 or P3 may comprise both one or more drilling sites 8 and one or more fixing openings 7.

The corner fitting 1 may also have at least one peripheral sealing strip 11 made of flexible material, such as an elastomer. The peripheral strip(s) 11 divide each outer surface S1, S2, S3 into two parts while still forming a closed loop overall. The peripheral strip(s) 11 ensure continuous leaktightness with respect to fluid (fuel) all around the corner fitting 1 between the two parts separated by the peripheral strip 11 in question on each outer surface S1, S2, S3. Thus, no fluid can circulate from a zone with fluid to a zone without fluid.

Advantageously, the corner fitting 1 has at least two peripheral strips 11, as shown in FIG. 1.

For the peripheral strip(s) 11, the corner fitting 1 has at least one peripheral groove 12 on the outer surface S1, S2, S3 of each of the at least three fixing plates P1, P2, P3. The peripheral groove(s) 12 thus each form a closed loop passing all around the corner fitting 1, in the process passing over each of the outer surfaces S1, S2, S3. In other words, each of the peripheral grooves 12 divides each outer surface S1, S2, S3 into two parts while still forming a closed loop overall. The peripheral strip(s) 11 are overmolded respectively on the bottom of a peripheral groove 12. A single peripheral strip 11 is overmolded on the bottom of each of the peripheral grooves 12.

Figure 3:
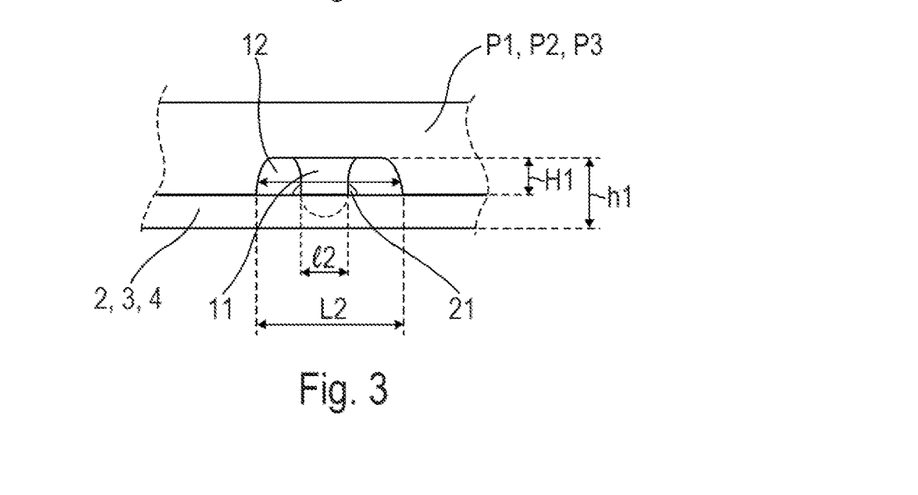
FIG. 3 shows a cross section of a corner fitting through a peripheral strip and a peripheral groove.
Figure 4:
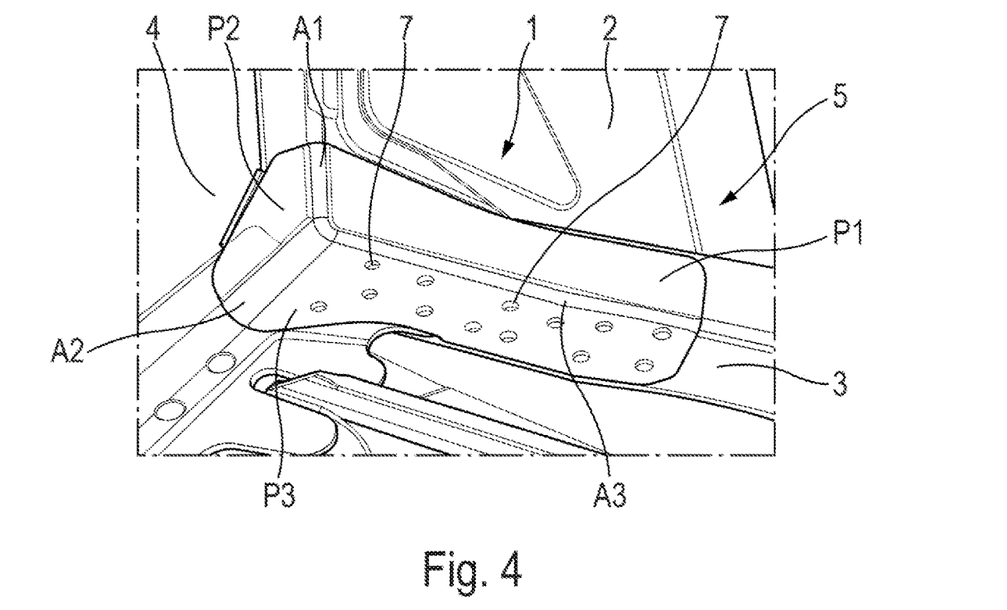
FIG. 4 shows a perspective view of a corner fitting installed on a corner of a box structure.
Figure 5:
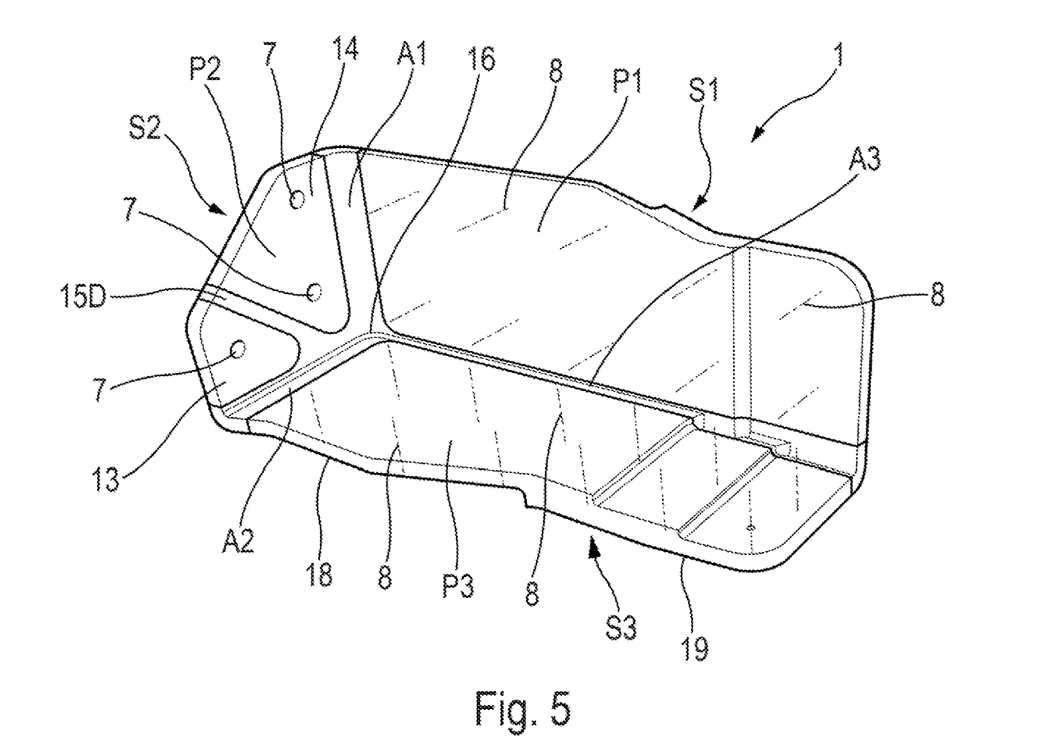
FIG. 5 shows a perspective view of one embodiment of a corner fitting having bearing surfaces of different heights. The view is directed at the inner surfaces (of the fixing plates) opposite to the outer surfaces.

With preference, and for the same reason as the O-ring(s) 6, the peripheral groove 12 has a width L2 greater than the width ℓ2 of the peripheral strip(s) 11 and a height H2 less than the height h2 of the peripheral strip(s) 11. FIG. 3 shows a cross section of a peripheral strip 11 overmolded in a peripheral groove 12. The dashed line shows the peripheral strip 11 in the non-deformed state. FIG. 3 also shows the peripheral strip 11 as a continuous line when the peripheral strip 11 is deformed when the corner fitting 1 is fixed to the walls 2, 3, 4 of the box structure(s) 5. FIG. 3 shows the deformation 21 of the peripheral strip 11 as a continuous line. The deformed peripheral strip 11 makes it possible to provide leaktightness while still enabling contact between the outer surfaces S1, S2, S3 and the contact surfaces of the walls 2, 3, 4.

When multiple peripheral strips 11 (for example three peripheral strips) are provided, a first peripheral strip is surrounded by a second peripheral strip. A third peripheral strip in turn surrounds the first peripheral strip and the second peripheral strip, and so on.

As shown in FIG. 1, the peripheral strip(s) 11 may comprise at least one portion 17 shared with one or more O-rings 6. In this case, the peripheral groove(s) 12 configured to receive a peripheral strip 11 may comprise a portion shared with one or more circular grooves 10 configured to receive an O-ring 6.

Figure 12:
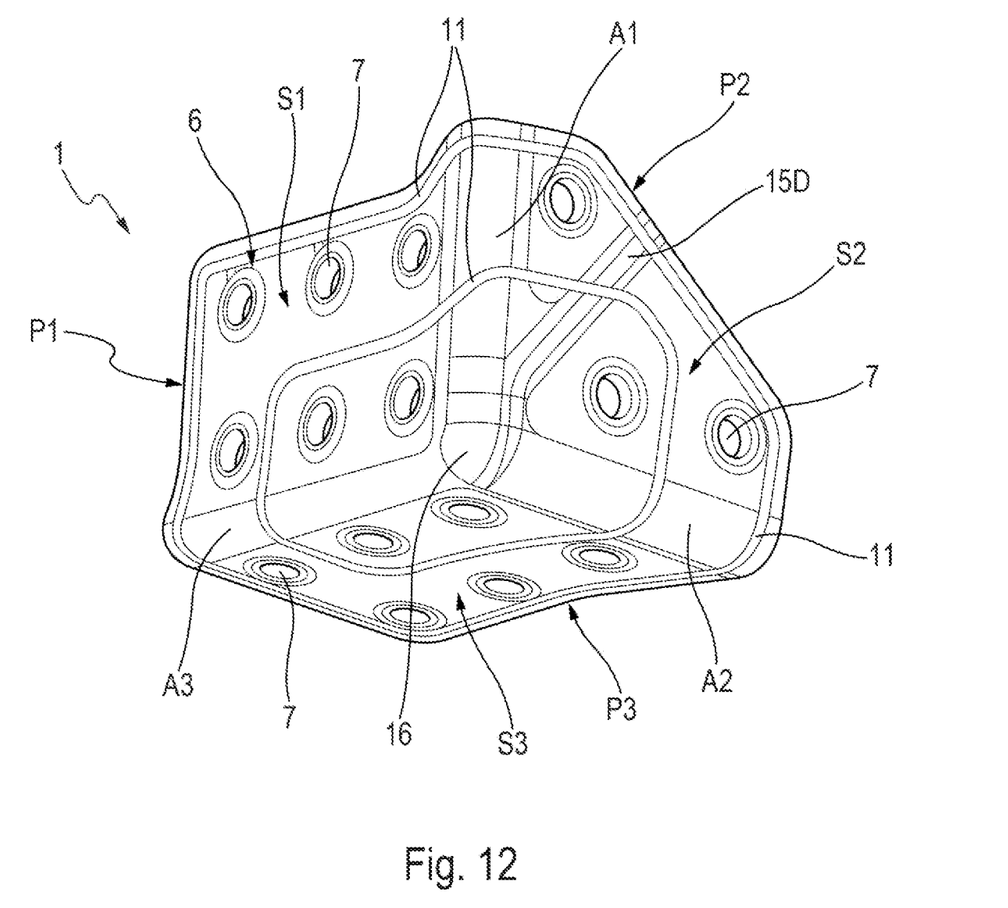
FIG. 12 shows a perspective view of one embodiment of the corner fitting. The view is directed at the outer surfaces of the fixing plates.

At the edge corners A1, A2, A3 made of flexible material, the peripheral strip(s) 11 may have an overthickness on the edge corner(s), as shown in FIG. 1 and FIG. 12.

Figure 6:
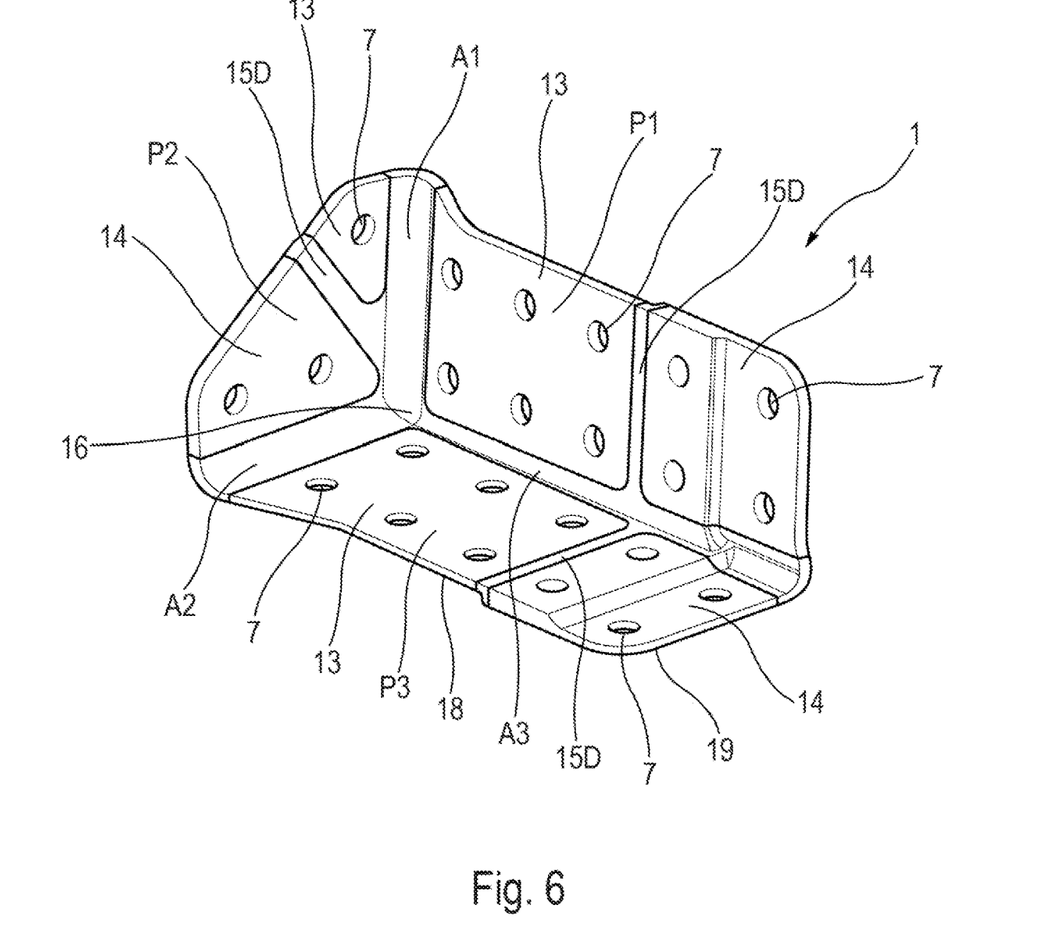
FIG. 6 shows a perspective view of one embodiment of a corner fitting having fixing plates with two portions joined by a separation joint. The view is directed at the inner surfaces of the fixing plates.

In one embodiment, at least one fixing plate S1, S2, S3 comprises at least two portions 13, 14 connected to one another by a separation joint 15D, 15C made of flexible material, such as an elastomer. The separation joint 15D, 15C made of flexible material is connected at one of its ends to at least one edge corner A1, A2, A3 of the corner fitting 1 (FIG. 6). The number of portions 13, 14 may depend on the number of contact surfaces of the walls 2, 3, 4 against which the corner fitting 1 must be fixed. The separation joint 15D may correspond to a straight joint 15D, as shown in FIG. 1 for the plates P1 and P3, in FIG. 5 for the plate P2, in FIG. 6 for the plates P1, P2 and P3, and in FIG. 12 for the plate P2. The separation joint 15C may also correspond to a curved joint 15C, as shown in FIG. 1 for the plate P2.

The outer surface S1, S2, S3 of at least one of the fixing plates P1, P2, P3 may comprise multiple bearing surfaces 18, 19 of different heights, against which the corner fitting 1 comes into contact with the wall(s) 2, 3, 4 of the box structure(s) 5. The difference in height between the bearing surfaces 18, 19 makes it possible to adapt the corner fitting 1 to various heights of the walls 2, 3, 4. For example, in FIG. 5, the fixing plate P3 has an outer surface S3 comprising two bearing surfaces 18, 19 of different heights. The flexibility of the corner fitting 1 makes it possible to facilitate the takeup of the mounting tolerances of the corner fitting 1, the outer surfaces S1, S2, S3 of which have multiple bearing surfaces 18, 19.

According to one embodiment, the portions 13, 14 of fixing plate P1, P2, P3 may correspond to portions 13, 14 having different bearing surfaces 18, 19. These portions 13, 14 are therefore connected to one another by separation joints 15D, 15C, as shown in FIG. 6. The separation joints 15D, 15C contribute to improving the takeup of the assembly tolerances.

Figure 10:
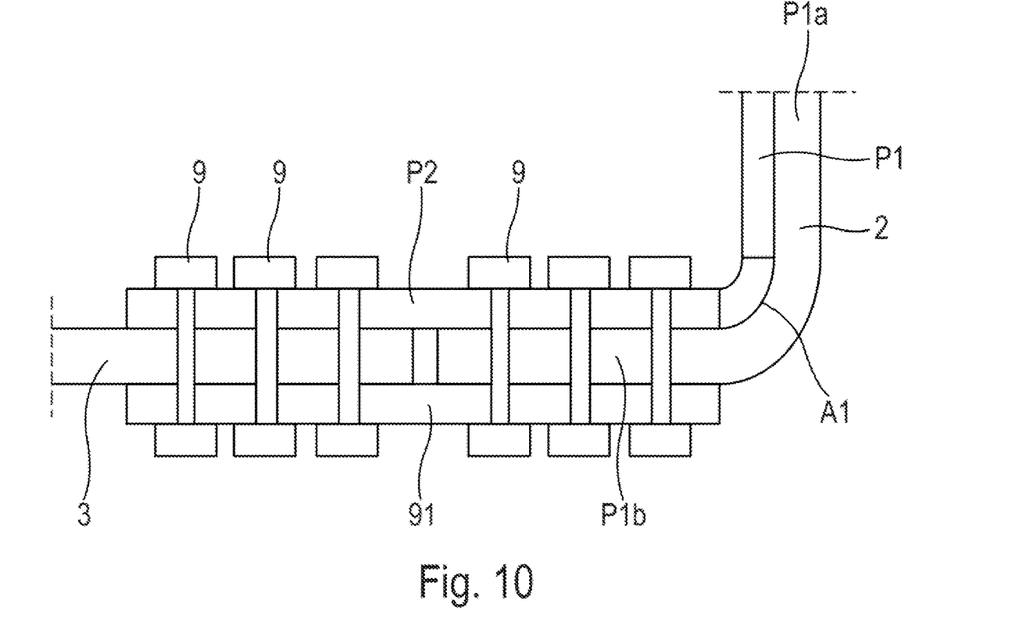
FIG. 10 shows a cross section of a corner fitting fixed to two walls of at least one box structure in a double lap shear fixing mode.

The corner fitting 1 may also be used in a double lap shear fixing mode, as shown in FIG. 10. In this fixing mode, one wall 2 may have the shape of an L with a first leg P1*a* and a second leg P1*b*. One wall 3 may be located in the continuation of the second leg P1*b* of the L. In this case, one fixing plate P1 is fixed to the first leg P1*a* of the L of the wall 2 and one fixing plate P2 is fixed to the second leg P1*b* of the L and to the wall 3. One plate 91 is also fixed in order to sandwich the second leg P1*b* and at least part of the wall 3 between the fixing plate P2 and the plate 91 using fixing elements 9.

The corner fitting 1 also makes it possible to use layers made of glass fibers if the at least three fixing plates P1, P2, P3 are manufactured from one material having a different galvanic potential from the galvanic potential of the wall(s) 2, 3, 4 of the box structure(s) 5. A layer of glass fibers may be inserted between the two. This may be the case when the at least three fixing plates P1, P2, P3 are manufactured from aluminum and the wall(s) 2, 3, 4 are manufactured from carbon fiber composite.

If there are cavities between the corner fitting 1 and the wall(s) 2, 3, 4, it is also possible to fill these cavities using a shimming liquid, a lubricant or any other inert material in order to avoid mold and corrosion.

The invention also relates to a method for manufacturing a corner fitting 1.

The method comprises a step E1 of installing at least three fixing plates P1, P2, P3 having an outer surface S1, S2, S3 configured to be fixed respectively to a wall 2, 3, 4 of the box structure(s) 5. Each of the at least three fixing plates P1, P2, P3 is installed such that each outer surface S1, S2, S3 is configured to be able to be fixed respectively to a wall 2, 3, 4 of the box structure(s) 5.

The method also comprises a step E2 of overmolding, in a mold, at least one edge corner A1, A2, A3 on at least three fixing plates P1, P2, P3 such that each of the at least three fixing plates P1, P2, P3 is connected to each of the other at least three fixing plates P1, P2, P3 by an edge corner A1, A2, A3 made of flexible material.

The overmolding step E2 also comprises overmolding at least one O-ring 6 made of flexible material, at least one peripheral strip 11 made of flexible material, and/or at least one separation joint 15D, 15C made of flexible material.

The overmolding step E2 may comprise the application of an adhesive to the at least three fixing plates P1, P2, P3 before introducing the parts made of flexible material (elastomer). The adhesive makes it possible to create chemical bonds during the step E2 of overmolding in the mold that have properties of resistance to mechanical stresses (tension, shear, etc.) that are substantially equivalent to the mechanical strength of the flexible material (elastomer).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A flexible corner fitting configured to contribute to a connection between at least three walls of at least one aircraft box structure, comprising:
   at least three fixing plates, and
   at least three edge corners made of a flexible material,
      each of the at least three fixing plates having an outer surface configured to be fixed respectively to a wall of the box structure,
      each of the at least three fixing plates being connected to each of the other at least three fixing plates by one of the edge corners made of the flexible material,
      wherein the at least three fixing plates are manufactured from a stiffer material than the flexible material of the at least three edge corners, enabling a movement of one of the at least three fixing plates relative to another of the at least three fixing plates.

2. The corner fitting according to claim 1, wherein at least one of the at least three fixing plates comprises at least one drilling site configured to be drilled so as to form a fixing opening configured to allow a fixing element to pass through, the corner fitting having at least one O-ring made of flexible material overmolded around at least one drilling site, the outer surface of the at least three fixing plates having a circular groove machined around the drilling site, the O-ring being overmolded on a bottom of the circular groove.

3. The corner fitting according to claim 1, wherein at least one of the at least three fixing plates comprises at least one fixing opening configured to allow a fixing element to pass through, the corner fitting having at least one O-ring made of flexible material overmolded around at least one fixing opening, the outer surface of the at least one plate of the at least three fixing plates having a circular groove machined around the opening, the O-ring being overmolded on a bottom of the circular groove.

4. The fitting according to claim 1, further comprising at least one peripheral sealing strip made of flexible material, the peripheral sealing strip dividing each outer surface into two parts while still forming a closed loop overall, the corner fitting having at least one peripheral groove passing over the outer surface of each of the at least three fixing plates, the peripheral groove forming a closed loop passing all around the corner fitting while passing over each of the outer surfaces, a single peripheral sealing strip being overmolded on a bottom of each of the peripheral grooves.

5. A flexible corner fitting configured to contribute to a connection between at least three walls of at least one aircraft box structure, comprising:
   at least three fixing plates, and
   at least three edge corners made of a flexible material,
      each of the at least three fixing plates having an outer surface configured to be fixed respectively to a wall of the box structure,
      each of the at least three fixing plates being connected to each of the other at least three fixing plates by one of the edge corners made of the flexible material, wherein at least one fixing plate comprises at least two portions connected to one another by a separation joint made of flexible material, the separation joint made of flexible material being connected to at least one edge corner of the corner fitting.

6. The corner fitting according to claim 1, wherein the flexible material corresponds to an incompressible hyperelastic material.

7. The corner fitting according to claim 1, wherein the flexible material corresponds to an elastomer.

8. An aircraft comprising at least one box structure having at least one corner, wherein a corner fitting according claim 1 is fixed to the at least one box structure.

9. A method for manufacturing a corner fitting, comprising the following steps:
  installing at least three fixing plates having an outer surface configured to be fixed respectively to a wall of a box structure, each of the at least three fixing plates being installed such that each outer surface is configured to be able to be fixed respectively to a wall of the box structure,
  overmolding at least one edge corner on the at least three fixing plates such that each of the at least three fixing plates is connected to each of the other at least three fixing plates by an edge corner made of a flexible material,
  wherein the at least three fixing plates are produced from a stiffer material than the flexible material of the at least one edge corner.

* * * * *